United States Patent [19]

Naito et al.

[11] 4,010,829

[45] Mar. 8, 1977

[54] HYDRAULIC SHOCK ABSORBER

[75] Inventors: Masaharu Naito; Kazuhiko Nomura, both of Hamamatsu, Japan

[73] Assignee: Yamaha, Hatsudoki Kabushiki Kaisha, Japan

[22] Filed: Sept. 24, 1975

[21] Appl. No.: 616,415

[30] Foreign Application Priority Data

Sept. 30, 1974 Japan ............................ 49-112557
Aug. 26, 1975 Japan ............................ 50-103177

[52] U.S. Cl. .............................. 188/278; 188/282; 188/298; 188/314; 267/64 R
[51] Int. Cl.² ............................................. F16F 9/52
[58] Field of Search ........... 188/276, 277, 278, 282, 188/298, 314, 317, 322; 267/64 R, 64 A

[56] References Cited

UNITED STATES PATENTS

| 2,212,259 | 8/1940 | Binder ........................... 267/64 R |
| 2,378,417 | 6/1945 | Linsley .......................... 188/314 |
| 2,723,006 | 11/1955 | Wyeth ........................... 188/277 |
| 2,881,869 | 4/1959 | Yarrick ........................... 188/277 |
| 3,194,547 | 7/1965 | Avner ............................ 267/64 R |
| 3,791,494 | 2/1974 | McNalley ....................... 188/277 |
| 3,882,977 | 5/1975 | Watanabe ....................... 188/282 |
| 3,887,174 | 6/1975 | Whelan et al. ................. 267/64 R |

FOREIGN PATENTS OR APPLICATIONS

| 661,843 | 7/1929 | France ........................... 188/277 |
| 409,907 | 3/1945 | Italy ............................... 188/317 |

Primary Examiner—Trygve M. Blix
Assistant Examiner—Edward R. Kazenske
Attorney, Agent, or Firm—Flynn & Frishauf

[57] ABSTRACT

A hydraulic shock absorber which comprises a piston rod inserted into a cylinder assembly; a piston fixed to the inner end of the piston rod to divide the internal space of the cylinder assembly into first and second oil chambers; and passage means designed to attain communication between both chambers and provided with an opening-variable orifice whose opening area automatically varies with the temperature of damping oil, wherein the damping property of said shock absorber is always kept constant independently of changes in the temperature of damping oil.

8 Claims, 7 Drawing Figures

HYDRAULIC SHOCK ABSORBER

BACKGROUND OF THE INVENTION

This invention relates to a hydraulic shock absorber, and more particularly to a telescopic type hydraulic shock absorber used with various vehicles such as motorcycles, automobiles, and snowmobiles.

It is known that a hydraulic shock absorber included in the suspension system of a vehicle carries out damping by the flow resistance which the damping oil held in a cylinder undergoes when conducted through the restricted passage or passages formed in a reciprocating piston.

With this type of hydraulic shock absorber, absorbed damping energy is converted into heat to raise the temperature of oil to, for example, 150° C at a maximum. The flow resistance of oil is governed by its viscosity which generally decreases with the rise of its temperature.

The restricted passage formed in the piston used with the prior art hydraulic shock absorber is provided with an opening-fixed oil orifice. Therefore, the conventional hydraulic shock absorber set at a prescribed level of temperature (usually, room temperature) declines in the damping property, when the temperature of oil is raised by the long operation of the shock absorber with the resultant fall in the viscosity of oil. In extreme cases, the so-called full bumping arises due to the piston forcefully impinging on the end wall of the cylinder. These drawbacks take place not only by absorption of damping energy, but also by changes in external factors such as seasonal or daily climatic conditions.

To resolve such difficulties, another type of hydraulic shock absorber has hitherto been developed in which a piston passage-restricting member provided with an opening-fixed orifice is detachably fitted to a reciprocating piston. With this type of hydraulic shock absorber, piston passage-restricting members provided with oil orifices having different opening areas are exchanged for each other according to average seasonal atmospheric temperature. However, not only replacement of the piston passage-restricting members calls for very difficult time-consuming work, but also the hydraulic shock absorber provided with said opening-fixed oil orifice fails to cope with the increased temperature of damping oil caused by absorption of damping energy or temporary changes in atmospheric temperature.

It is accordingly an object of this invention to provide a novel hydraulic shock absorber of simple construction which can automatically retain a constant damping property even when the temperature of damping oil changes.

Another object of the invention is to provide a hydraulic shock absorber, whose damping property is kept constant particularly during the initial period in which a shock is applied.

Another object of the invention is to provide a hydraulic shock absorber whose damping property is kept constant particularly during a period following said initial period of shock.

SUMMARY OF THE INVENTION

According to an aspect of this invention, there is provided a hydraulic shock absorber which comprises a piston slidably inserted into a cylinder assembly so as to divide the internal space of the cylinder assembly into first and second chambers; passage means provided in the piston to establish communication between both chambers; and variable oil flow-restricting means designed automatically to narrow the opening area of the passage means when the temperature of damping oil rises and automatically to broaden the opening area of the passage means when said temperature falls.

According to a preferred embodiment of this invention, the hydraulic shock absorber is further provided with a partition wall, which helps to provide a third chamber intended to compensate for that change in the total capacity of both first and second chambers which occur when a piston rod fitted with the piston reciprocates through the cylinder assembly. Said third chamber communicates with the second chamber through another passage means. Said another passage means may be provided with another oil flow-restricting means like the aforesaid type.

However, the third chamber may be replaced by any other known compensating means. For example, it is possible to provide a pneumatic pressure chamber on the opposite side of the second chamber to the piston so as to apply pneumatic pressure to the second chamber by means of a movable wall member, or a compensating rod reciprocating through the cylinder assembly in the same direction as the piston rod on the opposite side of the piston to the piston rod, namely, entering the cylinder assembly when the piston rod comes out therefrom and leaving said cylinder assembly when the piston rod is inserted thereinto.

According to another embodiment of this invention, the piston and partition wall are respectively provided with a damping passage fitted with a flow-check valve and designed to be operated independently of the first and second oil flow-restricting means or opening-fixed oil orifices communicating with the first and second passage means respectively.

The oil flow-restricting means may be formed of the wall of a valve seat and a movable valve member defining an opening-variable oil orifice with the wall of said valve seat. Said movable valve member should advisably be actuated by a heat-sensitive material which is substantially mechanically incompressible, and expansible and contractible at temperature rise and fall respectively. The heat-sensitive material described in the specification will be hereinafter referred merely as "a mechanically incompressible and thermally expansible heat-sensitive material". Said heat-sensitive material may be formed of, for example, wax or aluminium alloy. Wax used as a heat-sensitive material is preferred to be a mixed type consisting of various kinds of wax having such different melting points as are distributed in the same region where the temperature of operating oil changes.

DETAILED DESCRIPTION OF THE PREFERRED EMBODIMENTS

Figure 1:
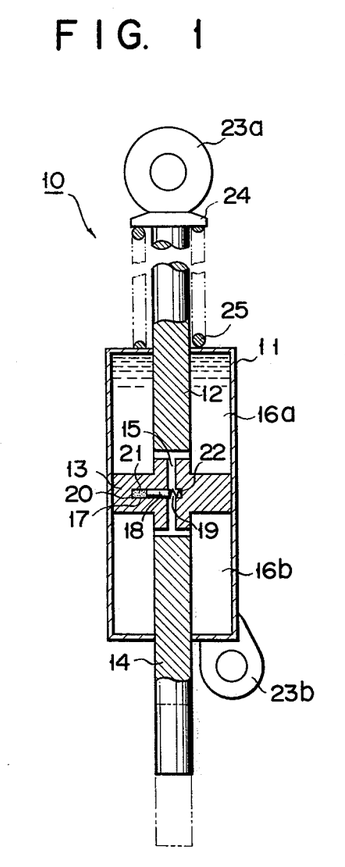
FIGS. 1, 2A and 2B represent the embodiments which are based on the principle of this invention.

A hydraulic shock absorber 10 of FIG. 1 comprises a cylinder 11 filled with damping oil; a movable piston rod 12 inserted into the cylinder 11 at one end thereof in liquid-tightness; movable partition means or a piston 13 fixed to the piston rod 12 so as to slide through the cylinder 11; and a compensating rod 14 extending from the opposite side of the piston 13 to the piston rod 12 and penetrating the other end face of the cylinder 11 in liquidtightness. The compensating rod 14 has a substantially equal diameter as the piston rod 12.

Damping passages 15 formed in the piston rod 12, piston 13 and compensating rod 14 allow upper and lower chambers 16a, 16b defined above and below the piston 13 to communicate with each other. A spool valve 18 slidably inserted into an elongate hole 17 intersecting the intermediate part of the damping passage 15 defines an opening-variable oil orifice 19 with the inner wall of said damping pasage 15. A "mechanically incompressible and thermally expansible heat-sensitive actuating material" 21 such as wax or aluminium alloy is received in a small chamber 20 provided on the left side of the spool valve 18. This spool valve 18 horizontally moves through the elongate hole 17 to an extent corresponding to the volumetric changes of the heat-sensitive actuating material 21. A spring 22 urges the spool valve 18 leftward.

Upper and lower eyed members 23a, 23b are connected, as already known, to the frame support (not shown) of a vehicle and an axle support (not shown) respectively. A compression coil spring 25 is stretched across a flange 24 of the upper eyed member 23a and the cylinder 11.

When the shock absorber 10 is subjected to a force of bringing down the piston 13 through the cylinder 11, then, the oil held in the lower chamber 16b flows through the damping passage 15 and opening-variable oil orifice 19 into the upper chamber 16a, thereby attaining a damping effect. Since, in this case, the compensating rod 14 comes out of the cylinder 11 to an extent corresponding to that portion of the piston rod 12 which enters the cylinder 11, the total capacity of the cylinder 11 does not change. Where the piston 13 rises through the cylinder 11, then the damping oil conversely runs from the upper chamber 16a into the lower chamber 16b.

As previously mentioned, the viscosity of damping oil more decreases as its temperature rises higher. If, in this case, the oil orifice 19 had a fixed opening area, then the flow resistance of the damping oil would decrease due to its lowered viscosity, resulting in a decline in the damping effect. According to the embodiment of FIG. 1, however, the heat-sensitive material 21 swells when the temperature of damping oil rises, causing the spool valve 18 to move to the right side of FIG. 1 with the resultant contraction of the opening area of the opening-variable oil orifice 19. Conversely where the temperature of damping oil drops, the heat-sensitive material 21 shrinks, causing the spool valve 18 to travel to the left side of FIG. 1 with the resultant broadening of the opening area of said oil orifice 19. Therefore, the damping property of the shock absorber always remains the same, regardless of changes in the temperature of damping oil.

Figure 2A:
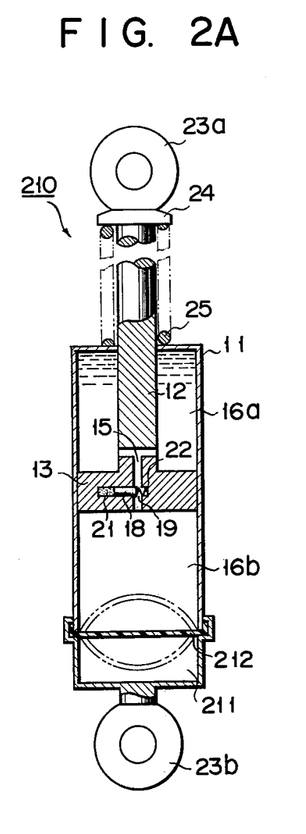

The shock absorber 210 of FIG. 2A is of substantially the same type as that of FIG. 1 excepting that compensation for changes in the capacity of the cylinder 11 is effected in a different manner. Therefore, the common parts of FIGS. 1 and 2 are denoted by the same numerals.

The shock absorber 210 is provided with a gas chamber 211 in place of the compensating rod 14 of FIG. 1. This gas chamber 211 is separated from the lower chamber 16b by movable partition means such as a flexible membrane 212. The gas chamber 211 is filled with a gas having a prescribed pressure. When the piston 13 falls through the cylinder 11, then the flexible membrane 212 is brought into the gas chamber 211 against its pressure to an extent corresponding to that portion of the piston rod 12 which enters the cylinder 11. Where the piston 13 rises through the cylinder 11, then the flexible membrane 212 is depressed into the lower chamber 16b by the pressure of the gas chamber 211 to an extent corresponding to that portion of the piston rod 12 which is drawn out of the cylinder 11. While the shock absorber 10 is operated, the spool valve 18 causes the oil orifice 19 to have its opening area varied with the temperature of operating oil. In the embodiment of FIG. 2A, the partition means separating the gas chamber 211 from the lower chamber 16b may be formed of the known free piston instead of the membrane 212.

Figure 2B:
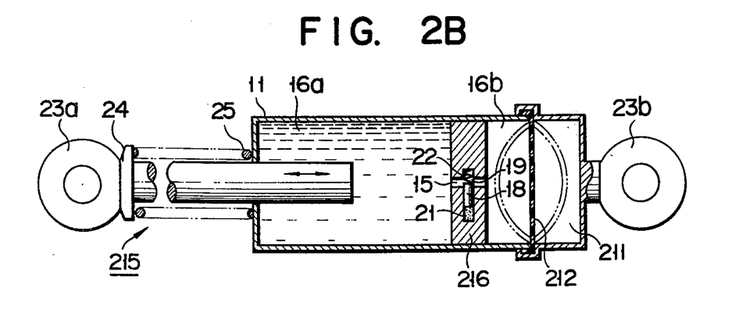

A shock absorber 215 shown in FIG. 2B is of substantially the same type as that of FIG. 2A, excepting that the movable partition means or piston 13 of FIG. 2A is replaced by a stationary partition wall member 216 fixed to the inner wall of the cylinder 11. Like the piston 13, said stationary wall member 216 is provided with a damping passage 15 for causing chambers 16a, 16b to communicate with each other, a spool valve 18 defining an opening-variable oil orifice 19 in said damping passage 15, and a "mechanically incompressible and thermally expansible heat-sensitive actuating material" 21. When the piston rod 12 is brought into the chamber 16a, the oil held therein flows into the chamber 16b through the damping passage 15 and oil orifice 19. Conversely when the piston rod 12 is drawn out of the chamber 16a, the oil received in the chamber 16b runs back into the chamber 16a through said damping passage 15 and oil orifice 19. In the embodiment of FIG. 2B, too, the above-mentioned heat-sensitive material 21 actuates the spool valve 18 according to temperature change, thereby enabling the shock absorber 215 to maintain a prescribed damping property.

Figure 3:
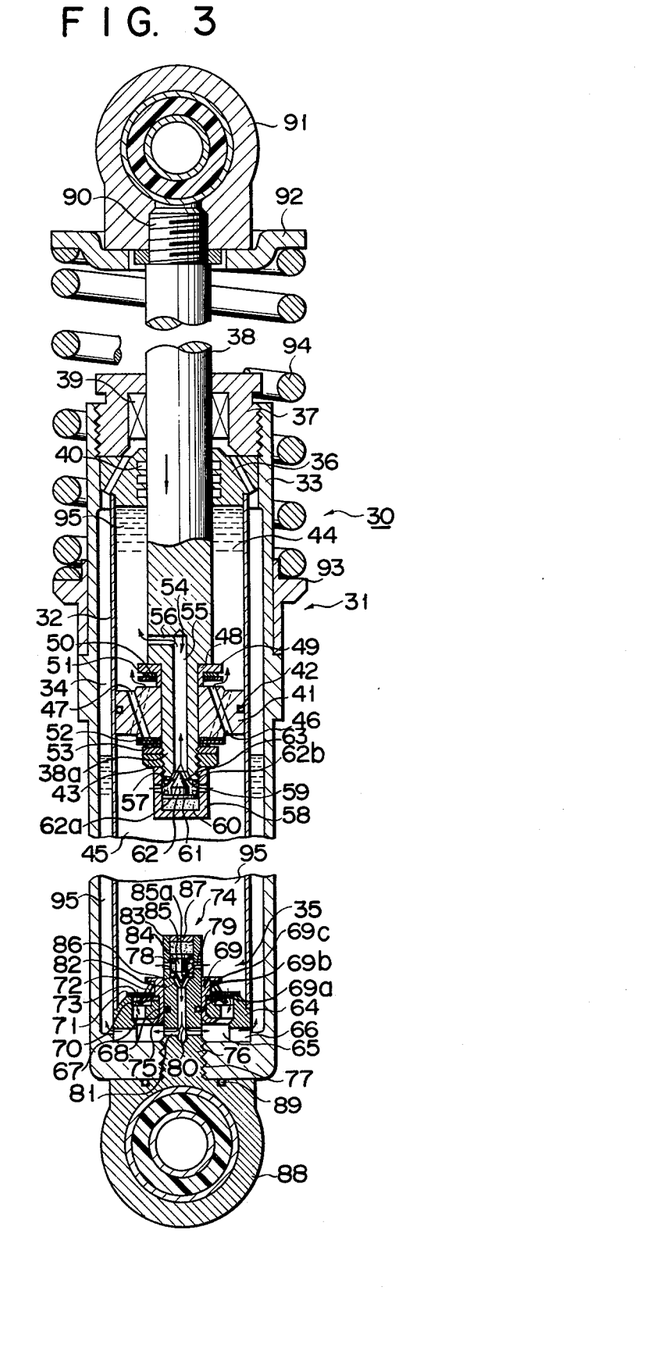
FIGS. 3 and 4 are longitudinal sectional views of a hydraulic shock absorber according to another embodiment of the invention, respectively showing the conditions in which a piston is falling and rising.
Figure 4:
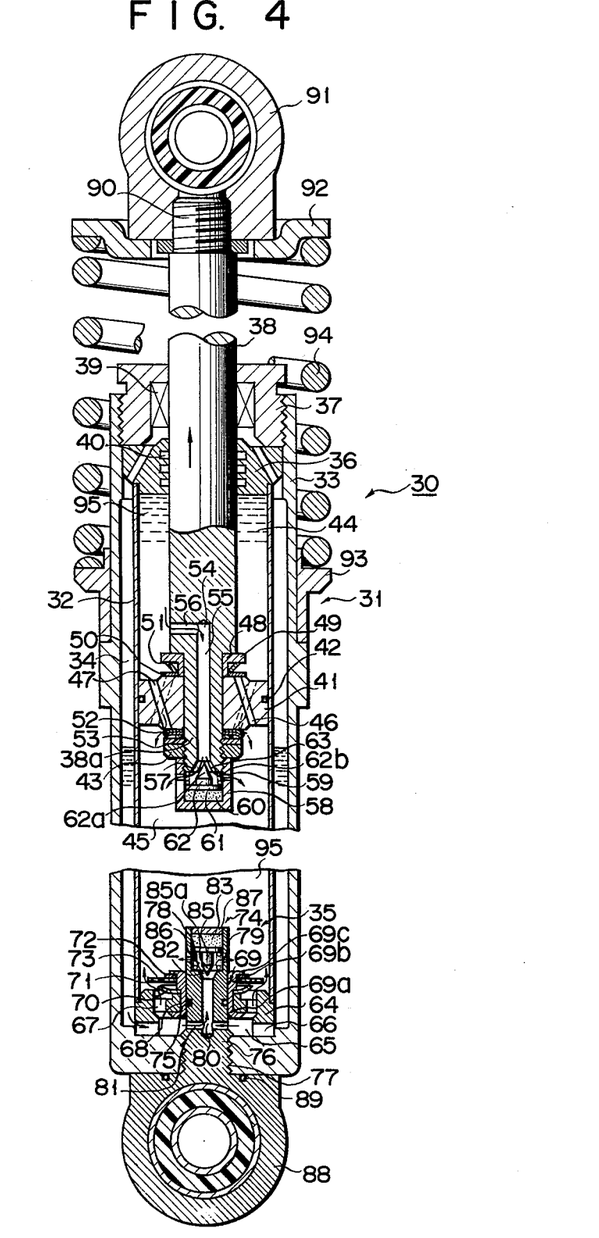

FIGS. 3 and 4 are more concrete representations of a hydraulic shock absorber according to another embodiment of the invention. A telescopic type hydraulic shock absorber 30 is provided with a cylinder assembly 31 comprising an inner cylinder 32 and an outer tube 33 surrounding said inner cylinder 32 in a spaced relationship. A reservoir 34 is defined between said cylinder 32 and outer tube 33. A foot valve assembly 35 fixed to the lower end of the inner cylinder 32 and concurrently acting as fixed partition means is held between said lower end of the inner cylinder 32 and the inner wall of the bottom portion of the outer tube 33. A sealing head 36 inserted into the upper end portion of the cylinder assembly 31 is fixed to the upper end of the inner cylinder 32 in a state pressed in liquidtightness against the inner wall of the outer tube 33. A seal holder 37 threadedly engages the upper end portion of the outer tube 33 in liquidtightness so as to hold the sealing head 36, cylinder 32 and foot valve assembly 35 in a prescribed position in the outer tube 33.

A movable piston rod 38 penetrates the seal holder 37 and sealing head 36 and is arranged in liquidtightness by a seal member 39 and labyrinth 40. Movable partition means or a piston 41 which slides through the cylinder 32 in the axial direction thereof in liquidtightness by means of an O-ring 42 is fixed by a nut 43 to a small diameter portion 38a formed at the lower end of the piston rod 38. Thus, the piston 41 and piston rod 38 jointly constitute a piston assembly. The piston 41 divides the internal space of the cylinder 32 into two chambers, namely, a first or upper oil chamber 44 defined by the piston 41, sealing head 36, and the inner wall of the cylinder 32 and a second or central oil chamber 45 defined by the piston 41, foot valve assembly 35 and the inner wall of the cylinder 32.

The piston 41 comprises two groups of oil passages for establishing communication between the upper oil chamber 44 and central oil chamber 45. Undamping passages 46 of a first group diverge downward, while damping passages 47 of a second group having opening-fixed oil orifices converge downward. The shoulder portion of the piston rod 38 adjacent to the small diameter portion 38a thereof is spaced from the upper end of the piston 41 by a spacer 48 provided with a flange 49.

A rigid check valve disk 50 surrounding the spacer 48 and movable axially of the cylinder 11 is urged by a dish-like spring 51 engaging a flange 49 so as to close up those openings of the undamping passages 46 which communicate with the upper oil chamber 44. The dish-like spring 51 has so low an urging force that the valve disk 50 is easily removed from the openings of the undamping passages 46 whenever the central oil chamber 45 has any slightly higher pressure than the upper oil chamber 44. Namely, the undamping passages 46 do not carry out damping. An elastic check valve disk 52 is set in place by the nut 43 through a spacer 53, and closes by its own urging force those openings of the damping passages 47 which communicate with the central oil chamber 45. The elastic valve disk 52 is designed to have such urging force that when the upper oil chamber 44 has a higher pressure by a prescribed extent than the central oil chamber 45, the elastic valve disk 52 open to damping passages 47 to carry out damping.

The piston rod 38 is provided with another passage 54 for establishing communication between the upper and central chambers 44 and 45.

The passage 54 includes an axial hole 55 extending upward from the lower end of said piston rod 38 and a radial hole 56 for establishing communication between the axial hole 55 and upper oil chamber 44. A conical valve seat wall 57 is formed at the lower end of the axial hole 55. Threadedly fitted to the lower end of the small diameter portion 38a of the piston rod 38 is a cup-shaped casing 58 whose periphery is bored with a plurality of radial holes 59. Received in said casing 58 is a heat-sensitive actuating material 60 formed of a "mechanically incompressible and thermally expansible material" such as wax or aluminium alloy. A disk 61 having a needle valve 62 is provided in the casing 58 above the heat-sensitive actuating material 60 so as to move to an extent corresponding to the volumetric change of said heat-sensitive actuating material 60. The upper end of the needle valve 62 is formed into a conical portion 62a which defines an opening-variable oil orifice 63 with the valve seat wall 57. A compression spring 62b normally urges the disk 61 and consequently needle valve 62 downward. The opening-variable oil orifice 63 is always opened to a smaller extent than the total opening area of the damping passages 47.

The foot valve assembly 35 comprises a valve housing member 64 defining a third or lower oil chamber 65 with the inner wall of the bottom portion of the outer tube 33. A plurality of radial passages 66 formed in the lower end portion of the peripheral wall of the valve housing member 64 establish communication between the lower oil chamber 65 and reservoir 34. A plurality of axial passages 67 formed in the upper wall of the valve housing member 64 allow the lower oil chamber 65 to communicate with the central oil chamber 45. Inserted into a through hole 68 formed at the center of the upper wall of the valve housing member 64 is the lower small diameter cylindrical portion 69a of a sleeve 69 consisting of said lower small diameter cylindrical portion 69a, upper large diameter cylindrical portion 69b and flange 69c. The sleeve 69 is fixed to the valve housing member 64 by the outward bent bottom end portion of the lower small diameter cylindrical portion 69a.

An elastic check valve disk 70 surrounding the sleeve 69 is held between the shoulder portion of the upper cylindrical portion 69b adjacent to the lower small diameter cylindrical portion 69a and the valve housing member 64. A rigid check valve disk 71 having a larger diameter than the elastic valve disk 70 is mounted thereon in a state urged toward the valve housing member 64 by a dish-like spring 72 stretched between the flange 69c of the sleeve 69 and the rigid valve disk 71 so as to close up the axial passages 67. The rigid valve disk 71 is made to move axially of the inner cylinder 32 along the upper cylindrical portion 69b of the sleeve 69 and has a plurality of communicating or damping holes 73 arranged in a prescribed pitch circle. Said holes 73 attain communication between the lower oil chamber 65 and central oil chamber 45 through the axial passages 67 and are normally closed by the elastic valve disk 70. The dish-like spring 72 has so small an urging force that whenever the lower oil chamber 65 has any slightly higher pressure than the central oil chamber 45, then the valve disk 71 can be easily removed from the openings of the axial passages 67.

Thus, said axial passages 67 are of the undamping type which does not take part in actual damping. The elastic valve disk 70 applies an urging force such that when the central oil chamber 45 has a higher pressure by a prescribed extent than the lower oil chamber 65, then the communicating holes 73 are opened for damping by said valve disk 70.

A columnar plug 74 is inserted in liquidtightness into the sleeve 69 through an O-ring 75, with the upper end of said plug 74 made to project into the central oil chamber 45. The plug 74 is provided at the lower end with a threaded portion 76, which in turn is fitted into a threaded hole 77 formed in the bottom wall of the outer tube 33.

The plug 74 is provided at the top with a recess 78 which communicates with the central oil chamber 45 through radial holes 79 and also with the lower oil chamber 65 through an axial hole 80 and radial holes 81. The inner wall of the upper end portion of the axial hole 80 is formed into an inverted conical shape constituting a valve seat 82. Received in the upper portion of the recess 78 is a "mechanically incompressible and thermally expansible heat-sensitive actuating material" 83 which is of the same type as the previously mentioned heat-sensitive actuating material 60. A disk 84 disposed below the heat-sensitive actuating material 83 is provided with a needle valve 85 so as to be moved axially of the inner cylinder 32 to an extent corresponding to the volumetric change of said heat-sensitive actuating material 83. The needle valve 85 is provided at the lower end with an inverted conical portion 85a, which defines an opening-variable coil orifice 86 with the wall of the aforesaid inverted conical valve seat 82. A compression spring 85b stretched across the disk 84 and the stepped portion of the recess 78 urges the disk 84 and consequently the needle valve 85, normally upward. The upper end of the recess 78 is closed up by a cover plate 87. The opening-variable orifice 86 is always opened to a smaller extent than the total opening area of the damping holes 73.

A lower eyed member 88 integrally formed with the lower end of the plug 74 is pressed in liquidtightness against the underside of the outer tube 33 through an O-ring 89, and is connected, as is well known, to a support member (not shown) of a vehicle axle.

A threaded portion 90 formed at the upper end of the piston rod 38 is threadedly inserted into an upper eyed member 91. A flanged member 92 is fitted to the lower end of the upper eyed member 91. A compression coil spring 94 is stretched across said flanged member 92 and another flanged member 93 mounted on the outer tube 33. The upper eyed member 91 is connected, as is well known, to a support member (not shown) formed on the frame of a vehicle. Damping oil 95 is fully filled in the upper, central and lower oil chambers 44, 45, 65 and also in the reservoir 34 to half its capacity. The remaining space of said reservoir 34 is filled with air.

There will now be described the operation of a hydraulic shock absorber according to the embodiment of the invention shown in FIGS. 3 and 4.

Referring to FIG. 3, where the wheel assembly of a vehicle is subjected to a force of pushing the cylinder assembly 31 upward and bringing down the piston rod 38 accordingly through the cylinder, then one part of the compressed oil held in the central oil chamber 45 flows into the upper oil chamber 44 through the radial holes 59, opening-variable oil orifice 63 and passage 55 and also runs into the upper oil chamber 44 through the undamping passages 46, by lifting the valve disk 50 against the force of the spring 51.

On the other hand, another part of the operating oil held in the central oil chamber 45 is conducted into the lower oil chamber 65 through the radial holes 79, recess 83, opening-variable oil orifice 86, axial hole 80, and radial holes 81 in turn to compensate for any decrease in the total capacity of the upper and central oil chambers 44, 45 which results from the advance of the piston rod 38 into the inner cylinder 32 and, only when the pressure of the central chamber 45 rises higher than a prescribed level, pushes aside the elastic valve disk 70 against its force to enter the lower oil chamber 65 through the holes 73 and axial passages 67. During this time, the damping passages 47 of the piston 41 remain closed by the elastic valve disk 52, and those openings of the axial holes 67 of the foot valve assembly 35 which face the central oil chamber 45 also remain closed by the rigid valve disk 71.

Since the dish-like spring 51 provided for use with the undamping passages 46 of the piston 41 only has a very small urging force, the damping oil almost freely enters the upper oil chamber 44 from the central oil chamber 45 through said undamping passages 46, and is not subjected to the restricting effect of the opening-variable oil orifice 63. On the other hand, the elastic valve disk 70 included in the foot valve assembly 35 has a relatively strong elastic force. Therefore, the damping oil flowing from the central oil chamber 45 into the lower chamber 65 undergoes the result of damping initially through the opening-variable oil orifice 86 and later through the communicating holes 73 and elastic valve disk 70.

Where, as shown in FIG. 4, the cylinder assembly 31 is subjected to a force of bringing it down and lifting the piston 41 accordingly through the cylinder 32, then the operating oil compressed in the upper chamber 44 is initially brought into the central chamber 45 through the passage 55, opening-variable oil orifice 63 and radial holes 59 and, only when the oil pressure in the upper chamber 44 exceeds a specified level, is carried into the central chamber 45 through the damping passages 47 against the urging force of the elastic valve disk 52. On the other hand, where the pressure of the central chamber 45 drops, then the oil held in the lower oil chamber 65 immediately flows into the central oil chamber 45 through the radial holes 81, axial hole 80, opening-variable oil orifice 86 and radial holes 79 in turn, as well as through the axial holes 67 against the force of the dish-like spring 72 so as to compensate for any increase in the capacity of said upper and central chambers 44, 45 caused by the withdrawal of the piston rod 38 from the cylinder 32.

Since the dish-like spring 72 has an extremely small urging force, the damping oil almost freely runs from the lower oil chamber 65 into the central oil chamber 45 through the axial holes 67 and is not subjected to the restricting effect of the opening-variable oil orifice 86. On the other hand, the elastic valve disk 52 has a relatively strong urging force, causing the operating oil traveling from the upper oil chamber 44 to the central oil chamber 45 to undergo the effect of damping initially through the opening-variable oil orifice 63 and later through the damping passages 47 and elastic valve disk 52.

With the embodiment of FIGS. 3 and 4, the opening-variable oil orifices 63, 86 have their opening areas defined, as previously mentioned, by the needle valves containing the heat-sensitive actuating materials 60, 83 respectively. Where the temperature of damping oil is raised with the resultant lower viscosity of said oil, for example, by hot atmospheric temperature or the absorption of damping energy, then the needle valves 62, 85 so act as to reduce the open space of the opening-variable oil orifices 63, 86 by the resultant swelling of the heat-sensitive actuating materials 60, 83. Conversely, where the temperature of damping oil falls, for example, by low atmospheric temperature with the resultant higher viscosity of said oil, then the needle valves 62, 85 are pushed back by the springs 62b, 85b due to the shrinkage of the heat-sensitive actuating materials 60, 83, thereby broadening the open space of the corresponding opening-variable oil orifices 63, 86. As the result, the damping oil passing through said orifices 63, 86 has a constant flow resistance, enabling the damping property of the hydraulic shock absorber of this invention to remain unchanged particularly during the initial period of shocks applied to a vehicle regardless of changes in the temperature and consequently viscosity of damping oil.

The above-mentioned embodiment was primarily intended to control the initial damping property of the subject shock absorber. In contrast, the undermentioned embodiment is mainly designed to control the damping property of the subject shock absorber during a period following said initial period of shocks.

There will now be described by reference to FIGS. 5 and 6 a hydraulic shock absorber according to another embodiment of this invention. The hydraulic shock absorber 100 comprises a cylinder assembly 101 consisting of a cylinder 102 and a cylindrical end member 103 threadedly fitted to one end of said cylinder 102 and locked by a lock nut 104. A sealing head 105 firmly engages the other end of the cylinder 102 in liquidtightness through an oil seal 106 by means of a seal holder 107 threadedly fitted to said cylinder 102.

A movable hollow piston rod 108 penetrates the sealing head 105 in liquidtightness through oil seals 109. Movable partition means or an annular piston 110 is held on that end portion of said hollow piston rod 108 which is disposed in the cylinder 102. Thus the piston 110 and piston rod 108 jointly constitute a piston assembly. The piston 110 is made to slide through the cylinder 102 in liquidtightness by means of an O-ring 111. A foot valve assembly 112 concurrently acting as fixed partition means is held through a collar 113 between said one end of the cylinder 102 and a stepped portion 103a formed on the end member 103. The internal space of the cylinder assembly 101 is divided into three portions, that is, a first or left oil chamber 114 defined by the sealing head 105, cylinder 102, and piston 110, a second or central oil chamber 115 defined by the piston 110, cylinder 102 and foot valve assembly 112 and a third or right oil chamber 116 defined by the foot valve assembly 112 and end member 103.

The end member 103 is provided with a semispherical portion 103b, to which a counterpart semispherical member 117 is threadedly fitted. A flexible membrane 118 having its edge clamped between the semispherical portion 103b and its counterpart semispherical member 117 divides a spherical chamber defined by both semispherical components 103b, 117 into a gas chamber 119 and an oil reservoir 120. A dish-like restraining plate 121 fixed to the inner wall of the semispherical portion 103b by screws 122 restricts the movement of the flexible membrane 118 and is also provided with a hole 123 for establishing communication between the right oil chamber 116 and oil reservoir 120. Provided at the top of the semispherical member 117 are a recess 124, small aperture 125 and screw socket 126. The gas chamber 119 is shut off from the atmosphere by a rubber-like elastic plug 127 fitted into the recess 124 and a screw 128 threadedly inserted into the screw socket 126. At the time of assembly, the screw 128 is taken off, and an injection needle (not shown) connected to a source of compressed gas is inserted into the plug 127, thereby charging gas into the gas chamber 119. The gas is chosen to have such pressure as is adapted for the desired initial damping property of the hydraulic shock absorber according to the embodiment of FIGS. 5 and 6. In this embodiment, the gas pressure is set at 15 to 20 Kg/cm$^2$. An eyed member 200 fixed to the end member 103 of the shock absorber 100 is connected, as is well known, to the support (not shown) of a vehicle axle. A hole 208 closed by a screw 209 is concurrently used for withdrawal of air and supply of operating oil.

The piston 110 is provided with a plurality of axially extending undamping passages 129 arranged on a pitch circle so as to attain communication between the left oil chamber 114 and central oil chamber 115. A sleeve 130 surrounding the piston rod 108 is held between the stepped portion of the piston rod 108 and piston 110 and has an outer flange 131 disposed adjacent to the end face of the piston 110. A rigid check valve disk 132 surrounding the sleeve 130 and capable of moving axially of the cylinder 102 is so urged as to close the undamping passages 129 by a dish-like spring 133 engaging the flange 131. This dish-like spring 133 has such a small urging force that whenever the central oil chamber 115 has any slightly higher pressure than the left oil chamber 114, then the valve disk 132 can easily open the undamping passages 129. Even when thus opened, these undamping passages 129 do not take part in actual damping.

The large diameter portion 130a of the sleeve 130 is provided with a plurality of radial holes 134 and an inner annular groove 135 communicating therewith. The piston rod 108 is bored with a plurality of radial holes 136 for establishing communication between the groove 135 and the internal space of the piston rod 108. A block member 137 pressed in liquid-tightness against the inner wall of the piston rod 108 by means of an O-ring 138 separates a hollow chamber 139 facing the inner end of the piston rod 108 from a hollow chamber facing the outer end thereof. The block member 137 has a recess 140, which communicates with the radial holes of the piston rod 108 through radial holes 141 and an outer annular groove 142 formed in the block member 137. The right side opening of the recess 140 is formed into a conical shape which acts as a valve seat 143. A cylindrical support member 144 threadedly fitted to the inner end of the piston rod 108 firmly fixes the piston 110 by holding the inner flange thereof between the inner end of the piston rod 108 and the outer flange of said support member 144. The inner threaded portion 144a of the support member 144 engages the threaded portion of a casing member 146 of a heat-sensitive control valve unit 145. The casing member 146 is provided with a slot 147 for receiving a tool designed to adjust the axial position of said casing member 146. This casing member 146 contains a "mechanically incompressible and thermally expansible heat-sensitive actuating material" 148 such as wax or aluminium alloy. A rod 149 to which a needle valve 150 is threadedly fitted is inserted into the casing member 146 so as to slide axially through a hole 151 lengthwise penetrating said casing member 146. A seal member 152 shuts off the internal space of the casing member 146 from the hollow chamber 139 in liquidtightness. The needle valve 150 is provided with a conical portion 150a which defines an opening-variable oil orifice 153 with the wall of the aforesaid conical valve seat 143. A compression coil spring 154 stretched across the stepped portion of the block member 137 and the flange of the needle valve 150 urges the needle valve 150 and consequently the rod 149 inward of the casing member 146.

The hollow chamber 139 communicates with the central oil chamber 115 through two damping passage means. First damping passage means consists of radial holes 155 formed in the piston rod 108, and an inner annular groove 156 and a plurality of axial holes 157 both formed in the piston 110. That side of the support member 144 which faces the central oil chamber 115 is fitted with a threaded plug 158, to which a ring 159 is threadedly fitted through a spacer 160. A rigid check valve disk 161 surrounding the support member 144 and capable of moving axially of the cylinder 102 closes the axial holes of the piston 110 by the force of a compression coil spring 162 engaging the ring 159. This compression coil spring 162 has such an urging force that only when the left oil chamber 114 has any higher pressure by a prescribed extent than the central oil chamber 115, then the valve disk 161 opens the axial holes 157 of the piston 110. The second damping passage means is formed of axial grooves 163 and an inner annular groove 164 both formed in the inner peripheral wall of the support member 144; radial grooves 165 and an axial hole 166 both provided in the threaded plug 158; and an opening-fixed orifice 167 of an orifice member 168 threadedly fitted to the threaded plug 158. According to the embodiment of FIGS. 5 and 6, the opening-variable oil orifice 153 is always opened to a larger extent than the opening-fixed oil orifice 167 and also to a smaller extent than the total opening area of the axial holes 157 of the piston 110 when the temperature of damping oil rises above a normal temperature.

The foot valve assembly 112 includes a valve housing member 169 provided with a plurality of undamping axial holes 170 arranged in a prescribed pitch circle so as to establish communication between the central oil chamber 115 and right oil chamber 116. A rigid check valve disk 171 capable of moving axially of the cylinder 102 is so urged by a dish-like spring 172 as to close those openings of the above-mentioned undamping axial holes 170 which face the central oil chamber 115. The dish-like spring 172 is supported by a stop ring 173 and has such a small urging force that whenever the right oil chamber 116 has any slightly higher pressure than the central oil chamber 115, the valve disk 171 easily opens the undamping axial holes 170. A cylindrical member 174 consisting of a large diameter portion 174a and a small diameter portion 174b is threadedly fitted to the valve housing member 169 of the foot valve assembly 112. An end cap 175 is pressed against the left end of the large diameter portion 174a of the cylindrical member 174. Threadedly fitted to said end cap 175 is the casing member 176 of a heat-sensitive control valve unit 177. That side of the casing member 176 which faces the central oil chamber 115 is bored with a slot 178 for receiving a tool designed to adjust the axial position of the casing member 176 and is also fitted with a threaded lock nut 179. The casing member 176 contains a heat-sensitive actuating material 180 of the same type as the previously mentioned material 148. A rod 181 to which a needle valve 182 is threadedly fitted is inserted into the casing member 176 so as to move axially through a hole 183 lengthwise penetrating said casing member 176. A seal member 184 shuts off the internal space of the casing member 176 in liquidtightness from a chamber 185 formed in the cylindrical member 174. A compression coil spring 186 urges the needle valve 182 and consequently the rod 181 inward of the casing member 176. A conical end portion 182a of the needle valve 182 defines an opening-variable oil orifice 188 with the wall of a conical valve seat 187 formed at the junction of the large and small diameter portions 174a, 174b of the cylindrical member 174.

The chamber 185 communicates with the central oil chamber 115 through radial holes 189 and also with the right oil chamber 116 through two damping passages means. First damping passage means consists of the opening-variable oil orifice 188; an axial hole 190 and radial holes 191 formed in the small diameter portion 174b of the cylindrical member 174; an annular space 192 provided between the small diameter portion 174b and valve housing 169; and a plurality of axial holes 193 formed in said valve housing 169. The second damping means is formed of the opening-variable oil orifice 188, axial hole 190, and an opening-fixed oil orifice 194 of an orifice member 195 threadedly fitted to the small diameter portion 174b of the cylindrical member 174.

An elastic check valve disk 196 held by the valve housing 169 and lock nut 197 closes by its own elasticity those openings of the axial holes 193 which face the right oil chamber 116. The degree of said elasticity is so chosen as to cause the axial holes 193 to be opened only when the central oil chamber 115 has a higher pressure by a prescribed extent than the right oil chamber 116. According to the embodiment of FIGS. 5 and 6, the opening-variable oil orifice 188 is always opened to a larger extent than the opening-fixed oil orifice 194 and also to a smaller extent than the total opening area of the axial holes 193 when the temperature of damping oil rises above a normal level.

Figure 5:
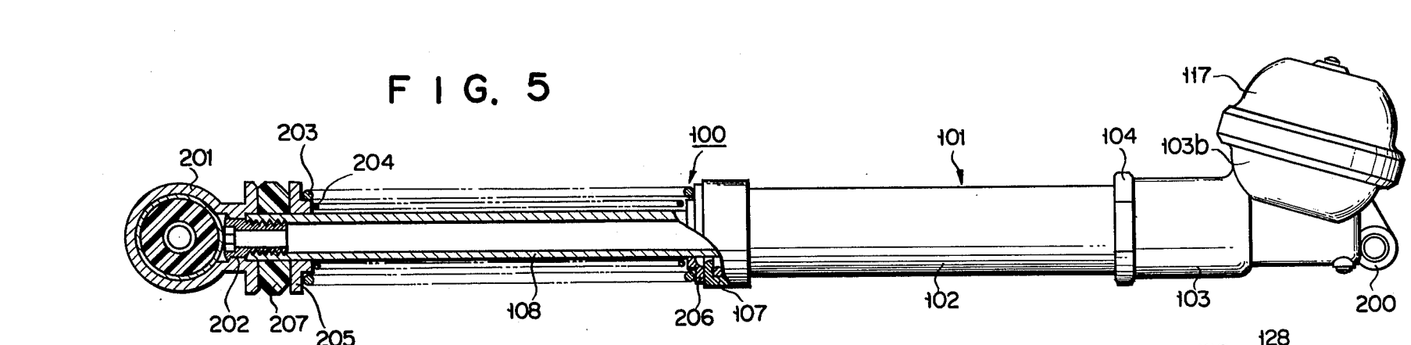
FIG. 5 is a side view, partly in section, of the whole of a hydraulic shock absorber according to still another embodiment of the invention.

As shown in FIG. 5, the outer end of the piston rod 108 is fixed to an eyed member 201 through a threaded member 202. This eyed member 201 is connected, as is well known, to a support (not shown) of a vehicle frame. Two compression oil springs 203, 204 are disposed between spring seat members 205, 206. The seat member 205 is pressed against the eyed member 201 through a rubber-like member 207, and the seat member 206 abuts against the seal holder 107 of the cylinder 102.

There will now be described the operation of the embodiment of FIGS. 5 and 6. Where the shock absorber 100 undergoes a force of moving the piston 110 to the right side relative to the cylinder 102, then one part of the compressed oil held in the central oil chamber 115 is brought into the hollow chamber 139 through the opening-fixed orifice 167, axial hole 166, radial grooves 165, annular space 164 and axial grooves 163 and then into the left oil chamber 114 through the opening-variable oil orifice 153, recess 140, radial holes 141, annular groove 142, radial holes 136, annular groove 135 and radial holes 134. At this time, another part of the damping oil pushes back the valve disk 132 and also enters the left chamber 114 through the axial holes 129. Therefore, the damping oil introduced into the left oil chamber 114 from the central oil chamber 115 is substantially free from the effect of damping. On the other hand, that portion of the damping oil which corresponds to the volume of the piston rod 108 advancing into the left oil chamber 114 is first conducted into the right oil chamber 116 from the central oil chamber 115 through the radial holes 189, chamber 185, opening-variable oil orifice 188, axial hole 190 and opening-fixed oil orifice 194, and then when the central oil chamber 115 has a higher pressure by a prescribed extent than the right oil chamber 116, pushes back the valve disk 196 to run into said right oil chamber 116. Therefore, the damping oil undergoes the effect of damping initially by the opening-fixed oil orifice 194 and later by the axial holes 193 and elastic valve disk 196. The oil which flows into the right oil chamber 116 is carried into the reservoir 120 against the pressure of the gas chamber 119.

Where the shock absorber is subjected to a force of moving the piston 110 leftward, then that portion of the damping oil which corresponds to the volume of the piston rod 108 withdrawn from the left oil chamber 114 is conducted into the central oil chamber 115 from the right chamber 116 through the opening-fixed oil orifice 194 by the pressure of the gas chamber 119, and also comes into said central oil chamber 115 through the axial holes 170 by pushing back the valve disk 171. As the result, the oil flowing from the right oil chamber 116 into the central oil chamber 115 is substantially free from the effect of damping.

The oil held in the left oil chamber 114 first passes through the radial holes 134, recess 140 and opening-variable oil orifice 153 and then into the central oil chamber 115 from the hollow chamber 139 through the opening-fixed oil orifice 167, and, when the left oil chamber 114 has a higher pressure by a prescribed extent than the central oil chamber 115, pushes back the valve disk 161 to enter the central oil chamber 115 also through the axial holes 157. Accordingly, the operating oil is subjected to the effect of damping initially by the opening-fixed oil orifice 167 and later by the axial holes and valve disk 161. The heat-sensitive actuating materials 148, 180 change in volume with the temperature of operating oil, and cause the opening-variable oil orifices 153, 188 to be opened in the correspondingly different degrees.

Figure 6:
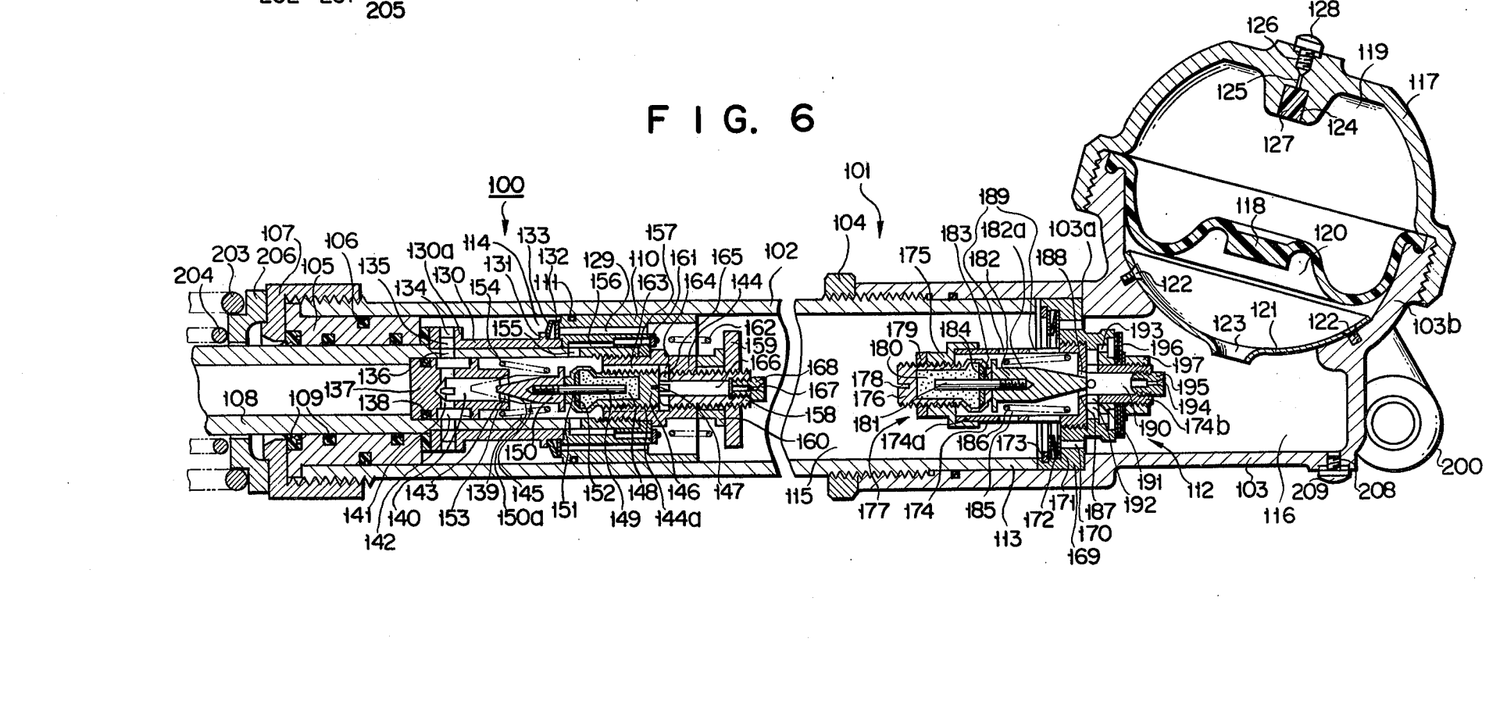
FIG. 6 is an enlarged longitudinal sectional view of the main part of the shock absorber shown in FIG. 5, showing the condition in which a piston rod is withdrawn from a cylinder assembly to a maximum extent.

In the embodiment of FIGS. 5 and 6, the opening-fixed oil orifices 167, 194 are always opened to a smaller extent than the minimum degree in which the corresponding opening-variable oil orifices 153, 188 are opened. Therefore, the damping property of the opening-fixed oil orifices 167, 194 is little controlled by the opening area of the opening-variable oil orifices 153, 188 during the initial period of shocks applied to the shock absorber, even when the temperature of operating oil rises above the normal level. On the other hand, the damping property of the holes 157, 197 is controlled by the opening area of the corresponding opening-variable oil orifices 153, 188 during a period following the aforesaid initial period of shocks.

With the embodiment of FIGS. 5 and 6, the opening-variable oil orifices 153, 188 may be opened to a smaller extent than the total opening area of the corresponding axial holes 157, 193 even when the temperature of operating oil falls below the normal level. In such an arrangement, the damping properties of the holes 157, 193 during a period following the initial period of shocks applied to the shock absorber can be controlled by the opening area of the corresponding opening-variable oil orifices 153, 188 at lower temperatures than the normal level. The originally set opening area of the opening-variable oil orifices 153, 188 may be changed by adjusting the positions of the casing members 146, 176, namely, the positions of the conical portions 150a, 182a of the needle valves 150, 182 relative to the walls of the conical valve seats 143, 187.

What we claim is:
1. A hydraulic shock absorber comprising:
a cylinder assembly;
a sealing head fixed to one end of the cylinder assembly;
a piston assembly including a piston reciprocatively inserted into the cylinder assembly and a piston rod secured to the piston so as to pass through the sealing head;
a foot valve assembly housed in the cylinder assembly near the other end thereof;
a first chamber defined by the cylinder assembly, sealing head and piston;
a second chamber defined by the cylinder assembly, piston and foot valve assembly;
a third chamber defined by the foot valve assembly and the other end of the cylinder assembly;
a damping oil filled in the first, second and third chambers;
first undamping passage means formed in the piston assembly to establish communication between the first and second chambers;
first check valve means for allowing the free flow of damping oil from the second chamber into the first chamber through the first undamping passage means when the piston rod enters the first chamber;
first damping passage means formed in the piston assembly to provide communication between the first and second chambers, said first damping passage means including a first damping passage provided with a first opening-variable orifice and communicating at its one end with the first chamber, a second damping passage communicating at its one end with the other end of said first damping passage and a third damping passage provided with a first opening-fixed orifice, said third damping passage communicating at its one end with the other end of the first damping passage and at its other end with the second chamber;
a first heat-sensitive valve unit for changing the opening area of the first opening-variable orifice as a function of the temperature of damping oil; said first heat-sensitive valve unit is manually adjustably coupled to the piston assembly so as to change the initial opening area of the first opening-variable orifice;
second check valve means for allowing restricted flow of damping oil from the first chamber into the second chamber through the first and second damping passages when the first chamber has a higher pressure by a predetermined extent than the second chamber;
second undamping passage means formed in the foot valve assembly to establish communication between the second and third chambers;
third check valve means for allowing the free flow of damping oil from the third chamber into the second chamber through the second undamping passage means when the piston rod is withdrawn from the first chamber;
second damping passage means formed in the foot valve assembly to provide communication between the second and third chambers, said second damping passage means including a fourth damping passage provided with a second opening-variable orifice and communicating at its one end with the second chamber, a fifth damping passage communicating at its one end with the other end of the fourth damping passage and at its other end with the third chamber, and a sixth damping passage provided with a second opening-fixed orifice, said sixth damping passage communicating at its one end with the other end of the fourth damping passage and at its other end with the third chamber;

a second heat-sensitive valve unit for changing the opening area of the second opening-variable orifice as a function of the temperature of the damping oil; said second heat-sensitive valve unit is manually adjustably coupled to the foot valve assembly so as to change the initial opening area of the second opening variable orifice;

fourth check valve means for allowing restricted flow of damping oil from the second chamber into the third chamber through the fourth and fifth damping passages when the second chamber has a higher pressure by a predetermined extent than the third chamber; and a reservoir filled with damping oil and communicating with the third chamber.

2. The hydraulic shock absorber according to claim 1, wherein said first heat-sensitive valve unit includes a first movable valve defining the first opening-variable orifice with the inner wall of the first damping passage and a first heat-sensitive actuating member for shifting the first movable valve to vary the opening area of the first opening-variable orifice, said first heat-sensitive actuating member comprising a heat-sensitive material which is substantially mechanically incompressible, and expansible and contractible at temperature rise and fall respectively; and said second heat-sensitive valve unit includes a second movable valve defining the second opening-variable orifice with the inner wall of the fourth damping passage and a second heat-sensitive actuating member for shifting the second movable valve to vary the opening area of the second opening-variable orifice, said second heat-sensitive actuating member comprising a heat-sensitive material which is substantially mechanically incompressible, and expansible and contractible at temperature rise and fall respectively.

3. The hydraulic shock absorber according to claim 2, wherein said heat-sensitive material is one selected from the group consisting of wax and aluminium alloy.

4. The hydraulic shock absorber according to claim 1, wherein the first opening-variable orifice has a larger opening area than that of the first opening-fixed orifice, and the second opening-variable orifice has a larger opening area than that of the second opening-fixed orifice.

5. The hydraulic shock absorber according to claim 4, wherein, at least when the damping oil has a lower temperature than normal operating temperature, the first opening-variable orifice has a smaller opening area than the cross-sectional area of the second damping passage, and the second opening-variable area has a smaller opening area than the cross sectional area of the fifth damping passage.

6. The hydraulic shock absorber according to claim 1 further comprising a pressure chamber containing compressed gas having a higher pressure than atmospheric pressure; and a movable partition member for separating the pressure chamber from the damping oil reservoir.

7. The hydraulic shock absorber according to claim 6, wherein said gas pressure ranges between 15 and 20 kg/cm$^2$.

8. The hydraulic shock absorber according to claim 1 further comprising a first orifice member defining said first opening-fixed orifice and detachably coupled to the piston assembly, and a second orifice member defining said second opening-fixed orifice and detachably coupled to the foot valve assembly.

* * * * *